United States Patent [19]
Brunson et al.

[11] Patent Number: 5,133,468
[45] Date of Patent: Jul. 28, 1992

[54] FOOTED HOT-FILL CONTAINER

[75] Inventors: David A. Brunson, Marietta; Stephen R. Lynn, Douglasville, both of Ga.

[73] Assignee: Constar Plastics Inc., Atlanta, Ga.

[21] Appl. No.: 715,345

[22] Filed: Jun. 14, 1991

[51] Int. Cl.⁵ .......................... B65D 1/02; B65D 1/42
[52] U.S. Cl. ..................................... 215/1 C; 220/606
[58] Field of Search ............... 215/1 C; 220/606, 608, 220/609, 633, 635, DIG. 14

[56] References Cited

U.S. PATENT DOCUMENTS

| | | |
|---|---|---|
| 3,598,270 | 8/1971 | Adomaitis . |
| 3,727,783 | 4/1973 | Carmichael . |
| 3,759,410 | 9/1973 | Uhlig . |
| 3,871,541 | 3/1975 | Adomaitis . |
| 3,935,955 | 2/1976 | Das . |
| 4,249,667 | 2/1981 | Pocock et al. . |
| 4,254,882 | 3/1981 | Yoshino . |
| 4,267,144 | 5/1981 | Collette et al. . |
| 4,294,366 | 10/1981 | Chang . |
| 4,318,489 | 3/1982 | Snyder et al. . |
| 4,335,728 | 1/1982 | Yoshino et al. . |
| 4,368,825 | 1/1983 | Motill . |
| 4,467,929 | 8/1984 | Jakobsen et al. . |
| 4,620,639 | 11/1986 | Yoshino . |
| 4,865,206 | 9/1989 | Behm et al. . |
| 4,867,323 | 9/1989 | Powers . |
| 4,892,205 | 1/1990 | Powers et al. . |
| 4,927,679 | 5/1990 | Beck ..................................... 215/1 C |
| 4,981,736 | 1/1991 | Feddersen et al. .................. 215/1 C |
| 4,993,567 | 2/1991 | Eberle, Jr. ............................ 215/1 C |
| 5,005,716 | 4/1991 | Eberle .................................. 215/1 C |
| 5,024,340 | 6/1991 | Alberghini et al. . |
| 5,047,271 | 9/1991 | Feddersen et al. .................. 215/1 C |

Primary Examiner—Joseph Man-Fu Moy
Attorney, Agent, or Firm—Locke Reynolds

[57] ABSTRACT

A blow-molded container of thermoplastic resin has a hollow body with a generally cylindrical side wall portion rotationally symmetric about a longitudinal axis of the container. A shoulder portion integrally joins the side wall portion to a finish. An integral base merging with the side wall is defined by an outer surface comprising a plurality of downward projections separated from each other by generally arcuate segments extending essentially from the cylindrical side wall to the longitudinal axis of the container. The shoulder and sidewall portions are tempered during formation of the container to withstand hot filling at a temperature of at least about 170° F. and subsequent introduction of a cryogenic liquid gas to provide an initial pressurization of at least 20 psi at the fill temperature.

7 Claims, 2 Drawing Sheets

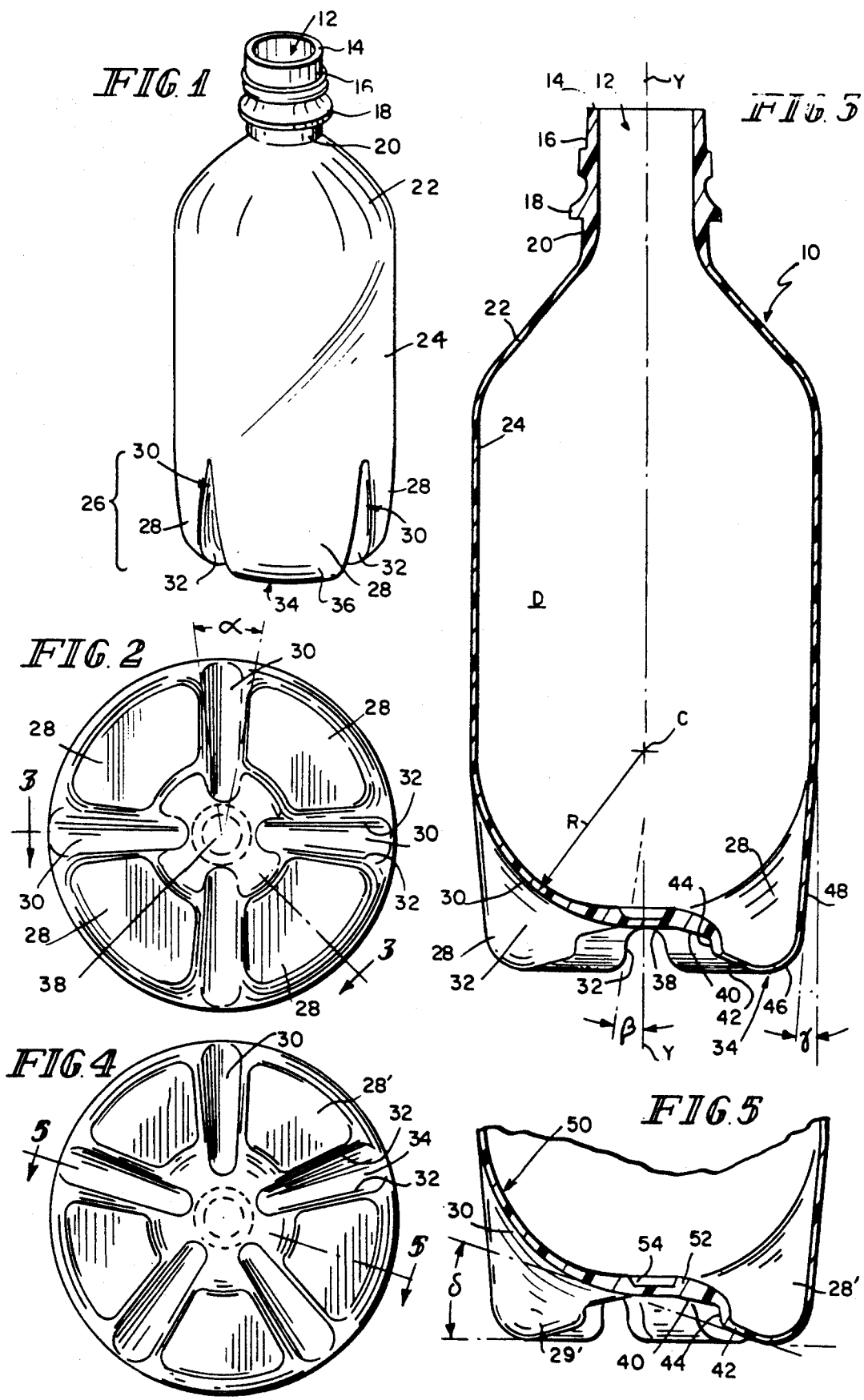

FOOTED HOT-FILL CONTAINER

BACKGROUND OF THE INVENTION

The present invention relates generally to the design, manufacture and use of blow molded polyester bottles and similar containers having sufficient dimensional stability to permit hot filling of the container.

Certain commodities require or at least are preferentially bottled at temperatures well above room temperature, often above about 170° F. (about 75° C.). Containers made of polyesters, such as polyethylene terephthalate, have typically required certain designs and treatment in order to retain their dimensional stability under such filling conditions. Absent the required design and treatment, polyester containers filled with a hot liquid can often exhibit significant shrinking and other deformation which can prevent the container from accepting a closure to seal the container and can exhibit other deformation which inhibits the commercial acceptance of the container.

When a container is hot filled and sealed at the hot fill temperature with an appropriate closure, the subsequent cooling of the filling material causes that material to contract thereby occupying less volume within the container. As a result, most prior designs for polyester containers adapted for hot filling have employed special panels and other features, typically situated in the sidewall of the container, to permit portions of the container to collapse inwardly in response to the temperature dependent contraction of the material within the container. Examples of such containers are shown in U.S. Pat. Nos. 4,822,543 and 4,863,046. Other containers have been designed which avoid the use of such collapse panels, but which incorporate concentric bands of varying thermally induced crystallization together with certain reinforcing features to reduce the overall flexibility of the container wall. An example of such a container is disclosed in U.S. Pat. No. 4,618,515. Such banded containers generally require significantly greater amounts of resin in order to provide the wall strength necessary to prevent collapse under the heat shrinkage of the container contents.

In copending U.S. patent application 07/696,831, it is proposed to form a container adapted for hot filling which includes a thin flexible side wall that avoids the use of collapse panels. In order to achieve the manufacture of such a container, certain modifications in the structure and process employed in blowing molds were adopted. Further, changes in packaging procedures were made in order to accommodate the new container. While the container disclosed in that application performed satisfactorily and in the intended manner, the rather small foot print of the container made it somewhat unstable. Additionally, further reductions in the amount of resin employed to form the container were desired.

Designs for larger foot print containers of one piece design have been developed recently for use in cold bottling principally of carbonated beverages. Examples of such containers are to be found in U.S. Pat. Nos. 4,865,206 and 4,978,015 as well as PCT publication WO 86/05462. A further example is to be found in copending U.S. patent application 07/592,778 now U.S. Pat. No. 5,024,340. Such containers are generally not suitable for hot filling due to their lack of dimensional stability discussed previously. In accordance with the present invention, it is proposed to construct a container suitable for hot filling which utilizes some of the design criteria previously employed in connection with such one piece wide foot print containers.

SUMMARY OF THE INVENTION

In accordance with the present invention, a polyester container having a flexible, right cylindrical body portion symmetric about a vertical axis includes an upper end including a shoulder and mouth of generally conventional design, and a lower end including a wide foot print base. The base is defined by an outer surface comprising at a plurality of downward projections, the lower most extent of which is arcuately extending. The downward projections are separated from each other by segments, which are preferably hemispherical, extending from the cylindrical side wall to the longitudinal axis of the container.

In a preferred embodiment, each of the downward projections has, in cross section, a first inclined portion contiguous to the longitudinal axis. A second inclined portion is situated radially outside of, and axially displaced downwardly from the first inclined portion. A generally perpendicular ring segment has an upper edge united with the first inclined portion and a lower edge united with the second inclined portion. The lower most extent of each downward projection is defined by a radially outwardly and upwardly curved portion having an inner edge united with the second inclined portion and an outer edge leading to the cylindrical side wall. The pair of inclined portions coupled together by the substantially perpendicular ring segment provides significant dimensional stability for the base. The wide stance and large arcuate proportion of each of the downward projections provides for significant mechanical stability for the container as a whole against tipping or toppling.

The stability of the bottom is provided in part by the base having a thickened resin portion extending at least from the inner margin of the first inclined portion through the lower edge of the generally perpendicular ring segment united with the second inclined portion. This thickened portion has a thickness of between about two to eight times the thickness of the side wall of the container. The inner surface is curved along each of the hemispherical segments such that the thickness is generally uniformly tapered from the cylindrical side wall to a point contiguous to the longitudinal axis of the container. The stability of the bottom is also provided in part by providing the base with a very small radius curved portion between the outer margin of the first inclined portion and the upper edge of the generally perpendicular ring segment. The radius of this curved portion is preferably between about 0.015 in. and about 0.090 in.

During the manufacture of a container in accordance with the present invention so as to provide dimensional stability for the remainder of the container, the right cylindrical body portion and shoulder portion are subjected to a thermal stabilization process by which those portions of the container is tempered to withstand a fill temperature of at least 170° F. A preferred process for tempering the container of the present invention is disclosed in U.S. Pat. No. 4,385,089, hereby incorporated by reference. In the preferred embodiment a parison is blown within a mold having a heated upper portion so that the right cylindrical body portion and shoulder portion contact the heated mold portion for a period of time sufficient to thermally stabilize those portions of the container. The present invention is not specifically limited to the thermal stabilization process disclosed in U.S. Pat. No. 4,385,089, and contemplates that containers in accordance with the present invention could be made using alternative thermal stabilization processes.

One feature of such a polyester container which is then tempered to withstand hot fill is the presence of the thin flexible side wall and reduced overall weight of the container as compared to comparably sized containers using side wall reinforcing or even collapse panels. This feature provides the container with an advantage of using less resin and therefore permitting the production of containers at lower cost. The container also exhibits improved handling stability over that observed for so called champaign base containers due to its wider foot print.

The container of the present invention can be used to bottle both cold and hot liquids. When the container is used to bottle hot liquids, the container is hot filled so as to leave a headspace. The headspace is pressurized by the addition of a metered amount of a cryogenic liquified gas such as liquid nitrogen. The container and contents are then quickly sealed with a closure of appropriate design. The cryogenic liquified gas, warmed by the hot liquid in the container, pressurizes the container to an initial pressure between about 20 and 50 psi. The container and contents are then cooled to a storage temperature. The amount of liquified gas and the volume of the headspace in which the gas is placed is selected so as to provide a positive pressure of the gas in the headspace at the storage temperature.

This feature has the advantage of allowing the side wall of the container to always be in tension at all use temperatures during and after the filling process. The strength for this side wall tension can be provided by the natural properties of the oriented polyester resin alone thereby eliminating the need for any collapse panels, side reinforcing, or unusually large amounts of resin. The preferred resin employed to make the container is polyethylene terephthalate (PET). The avoidance of the use of collapse panels has the advantage of permitting a wider range of container designs thereby contributing to consumer acceptability. Surprisingly, it has been found that it is not necessary to subject the base portion of the container to any thermal stabilization treatment to obtain dimensional stability during hot fill at a temperature of 185° F. Further, the headspace volume uniformity is significantly enhanced by the thermal stabilization or tempering of the right cylindrical body portion and shoulder portion of the container.

These and other features of the present invention, together with their inherent advantages, will become apparent to those skilled in the art upon consideration of the following detailed description of preferred embodiments exemplifying the best mode of carrying out the invention as presently perceived. The detailed description particularly refers to the accompanying drawings.

BRIEF DESCRIPTION OF THE DRAWINGS

FIG. 1 is a perspective view of a container constructed in accordance with the present invention.

FIG. 2 is a bottom plan view of the container shown in FIG. 1.

FIG. 3 is a sectional view taken along lines 3—3 of FIG. 2.

FIG. 4 is a bottom plan view of an alternative embodiment of the present invention.

FIG. 5 is a sectional view of the lower portion of the container shown in FIG. 4 taken along lines 5—5.

DESCRIPTION OF PREFERRED EMBODIMENTS

Figure 6:
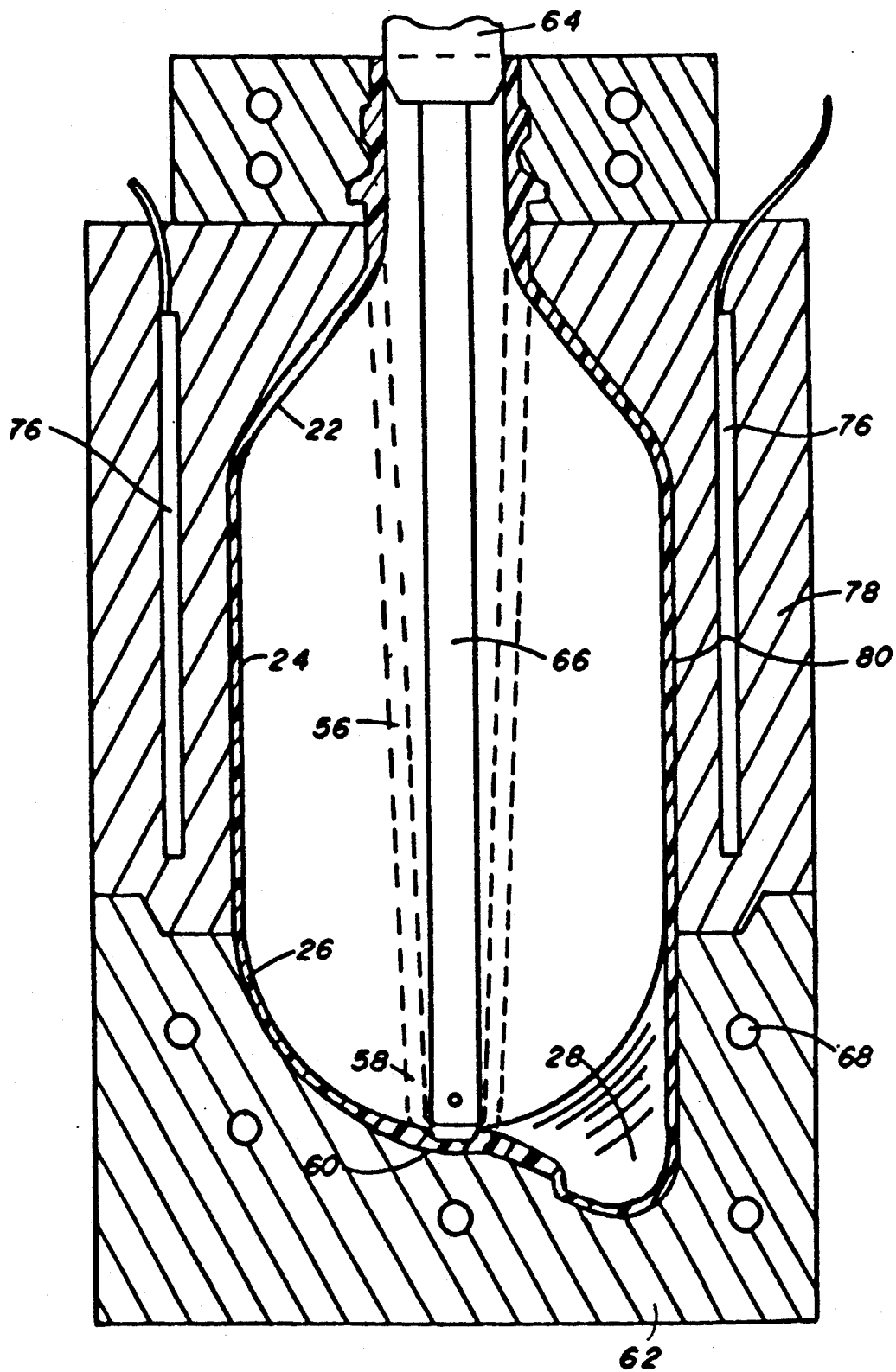
FIG. 6 is a diagramatical view of a mold in which a container of the present invention is being formed.

A perspective view of a container 10 made in accordance with the present invention appears in FIG. 1. The container 10 includes a mouth 12 defined by a rim 14 at the top of a finish 16 adapted, in the conventional manner, to receive a closure (not illustrated) for sealing the contents of the container. A support ring 18 below the finish 16 is employed during the blow-molding procedure in the usual manner. Immediately below the support ring 18 is neck 20 which flares outwardly via shoulder portion 22 to a generally cylindrical side wall 24. The container terminates at its lower end in a base 26 which is integrally formed with the cylindrical side wall 24. While the container 10 is shown in FIG. 1 to have a mouth 14 which is only a small fraction of the diameter of the cylindrical side wall 24, the size and appearance of that portion of the container above the cylindrical side wall plays no unique part in the present invention and is merely for illustrative purposes so as to show a complete container 10.

The base 26 includes a plurality of arcuately extending downward projections 28 which are separated from each other by hemispherical arc segments 30. The hemispherical arc segments 30 are at the intersection of slanted radial facets 32 which define the sides of each of the downward projections 28. The uppermost ends of the hemispherical arc segments 30 define a circle 29 lying in a plane normal to the axis Y, shown in FIG. 3, which circle can be viewed as the union between the base 26 and the cylindrical side wall 24. The lower most extremities of each of the downward projections is an arcuate line segment 34 on a radially outwardly and upwardly curved outer surface 36.

A plan view of the bottom as shown in FIG. 2, reveals a central portion 38 surrounded by four arcuately extending downward projections 28 which are in turn separated from each other by four hemispherical segments 30. The slanted radial facets 32 define the sides of each of the arcuately extending downward projections 28 and merge with the hemispherical segments 30. The hemispherical segments and adjoining slanted radial facets 32 occupy an angle a which is shown to be about 20°. The arcuate extent of the downward projections 28 is then about 70° in the embodiment shown in FIGS. 1 and 2.

In the sectional view shown in FIG. 3, it will be seen that the cylindrical side wall 24 is generally symmetric about a longitudinal axis Y of the container 10. The hemispherical segment 30 can be seen to be the result of a constant radius R established from a center of curvature C located on the longitudinal axis Y. Each of the downward projections 28 includes a first inclined portion 40 and a second inclined portion 42 joined together by a substantially vertical ring segment 44. The inner margin of the first inclined portion merges with the central portion 38 contiguous to the longitudinal axis Y. The first inclined portion is shown to be radially inside and axially upwardly offset from the second inclined surface 42 by virtue of the essentially perpendicular ring segment 44.

A very small radius curved portion 43 is between the outer margin of the first inclined portion 40 and the upper edge of the generally perpendicular ring segment 44. The radius of curved portion 43 is preferably between about 0.015 in. and about 0.090 in. However, if the curved portion 43 has a radius of greater than about 0.060 in., the generally perpendicular ring segment 44 has an increasing tendency to flatten when the container 10 is filled and the headspace pressurized with cryogenic liquid as later described. If the curved portion 43 has a radius of less than about 0.015 in., the container base may be susceptable to stress cracking and failure at this point. It has been found that with this curved portion 43 having a radius of about 0.030 in., the container 10 is suitable for use in a wide variety of filling and handing situations.

The outer margin of the second inclined portion merges with a radially outward and upwardly curved portion 46 which defines the axially lower most extent of each downward projection forming a generally circular but segmented ring 34 defining the foot print on which the container stands. An outer wall portion 48 which is inclined at an angle Y with respect to the cylindrical side wall 24 joins the cylindrical side wall to the curved portion 46. As shown in FIG. 3, the angle Y is between about 1° and 10°, and preferably about 5° thereby permitting the ring 34 to have a diameter d which is approximately 0.7 times the major diameter D of the cylindrical side wall 24. The facets 32 which define the sides of the downward projections are shown to be inclined at an angle B with respect to a plane passing through the axis of symmetry Y. As shown in FIG. 3, the angle B is about 10°.

While FIGS. 1–3 illustrate an embodiment of the container 10 having four downward projections 28, the number is subject to some variation. FIGS. 4 and 5 illustrate another embodiment of the container 10 having five downward projections 28'. It will be noted that the hemispherical segments 30 and adjacent slanted radial facets 32 occupy approximately the same arcuate extent as shown in FIG. 2 while the arcuate extent of each of the downward projections 28' occupies only about 55°–57°. From the sectional view in FIG. 5, it will be seen that the upper inclined portion 40 and the lower inclined portion 42 are inclined at about the same angle so as to be essentially parallel to each other and inclined at an angle S with respect to the underlying surface. The angle S is preferably greater than 10°, and is shown in FIG. 5 to be about 15°. It is to be additionally noted that angle S of inclination of the lower segment 42 and the vertical extent of the perpendicular ring segment 44 is such that the lower inclined portion 42 is co-planar with a tangent to the opposite hemispherical segment 30.

The base 26 of the container 10 is further defined by an inside surface 50 which does not mirror the outside surface but rather provides for a thickened portion 52 extending from the inner margin of the first inclined portion 40 through the lower edge of the perpendicular ring segment united with the second inclined portion 42. This thickened portion has a thickness between about 2 and 5 times the thickness of the cylindrical side wall 24 and inclined outer wall portions 48. The thickened portion 52 tapers essentially uniformly along the length of the hemispherical segments 30 from a maximum thickness contiguous to the axis Y to a thickness corresponding to the cylindrical side wall 24 at the merger therewith.

The stretch rod 66 is forcibly urged downwardly so as to stretch the parison 56 as shown in FIG. 6 such that the bottom end portion 58 of the parison i positioned adjacent to surface 60 of base mold 62 chilled by cooling means 68. The step 54 shown in the interior of the thickened portion in the area of the central region 38 is an artifact caused by the extension of the stretch rod 66 during the blowing process into "soft contact" with the interior of the base mold 62 to ensure that the parison 56 does not wander during the blowing operation illustrated generally in FIG. 6 but should be minimized so as to inhibit any stress riser occurence at this point. This soft contact assures the proper deposition of a lower portion of the parison as shown in FIGS. 3 and 5 so as to achieve the desired mechanical strength in the container while placing sufficient resin to fully develop the downward projections 28 and 28'.

The downward stretching of the parison 56 causes a proportional thinning of the side wall as is well known in the art. During the stretching step illustrated in FIG. 6, a small amount of preblow air is preferably introduced through the nose piece 64. Once the stretch rod 66 has reached the limit of its full downward extension, blowing fluid, typically compressed air, is introduced through the nose piece 64 to radially expand and biaxially orient the polyester forming the parison 56. As the parison 56 stretches outwardly from the position shown in phantom, it comes in contact with inside wall surface 80 of the portion 78 of the mold which defines the cylindrical body portion 24 and shoulder portion 22 which has been heated by heating means 76 to a temperature significantly above the minimum effective temperature for biaxial orientation of the polyester, preferably in general accord with the limits set forth in U.S. Pat. No. 4,385,089.

As the blowing fluid continues to enter through the nose piece 64, the parison assumes the shape of the interior of the blow mold 62 and is held there for time sufficient to temper the polyester in the side wall and shoulder portions. Once the tempering of the cylindrical body portion 24 and shoulder portion 22 of the blown container is completed, the pressure within the container is released, the various mold portions separate from each other and the container is then be removed from the mold in the usual manner thereby forming a container generally in accordance with the present invention. It may be advantagous to use a vented stretch rod as disclosed in copending U.S. patent application 07/696,831 hereby incorporated by reference to achieve the most desirable cooling of the container with the pressure releases.

In use, a container in accordance with the present invention has particular benefit when employed in hot fill operations, that is, where the container is filled with a liquid above about 170° F. In such a filling operation, the container is filled with a liquid, the liquid being maintained at a temperature of between 170° F. and about 190° F., and perhaps to even higher temperatures if required. The liquid is filled to a level such that a headspace remains above the liquid in the container of predetermined volume. A typical fill line F is shown in FIG. 1 with the space S above the fill line being the headspace. This headspace is then pressurized with a supply of cryogenic liquified gas which preferably is chemically nonreactive with the liquid contents of the container. In most filling operations, liquid nitrogen is a preferred gas. The container and contents are then quickly sealed with a closure of conventional design so as to retain the hot liquid and the supply of cryogenic liquified gas in the container. The cryogenic liquified gas, warmed by the hot liquid in the container, pressurizes the container to an initial pressure between about 20 and 50 psi.

The container and contents are then cooled to the desired storage temperature. This cooling generally causes the hot liquid within the container to shrink thereby lowering the level of the liquid within the container from the fill line F to a new product line F'. This has the effect of increasing the volume of the headspace S which, together with the change of the temperature of the gas filling the head space, causes the pressure within the head space to drop from the initial pressure to a new much lower pressure. In accordance with the present invention, the amount of liquid nitrogen contributing to the initial pressure is selected such that once the contents of the container is cooled thereby increasing the volume of the headspace S, the pressure within the headspace still remains positive with respect to atmospheric pressure thereby preventing any inward collapse or paneling by the flexible side wall 12 of the container.

If the initial pressure of the gas is too low, then paneling of the side will occur due to its inherent flexibility. On the other hand, if the initial pressure in the headspace is too great, then the high pressure coupled with the hot temperature of the fill liquid can cause plastic deformation to occur in the container.

While containers constructed in accordance with the present invention are suitable for hot fill operations, the tempering process on the upper portion of the container gives the container inhanced strength characteristics which may be employed in other circumstances as well. Further, negligible difference in performance and characteristics has been observed even when rapid cooling of hot filled liquids has not been employed. This suggests that the rapid cooling step of conventional hot fill operations may be omitted without adversly affecting the container or its contents. Further no difference in performance has been detected with the use of parisons of widely differing ages and accumulated moisture. This suggests that the maintainence of parisons in specially controlled atmosphere areas will no longer be necessary.

Although the invention has been described in detail with reference to certain preferred embodiments and specific examples, variations and modifications exist within the scope and spirit of the invention as described and as defined in the following claims.

What is claimed is:

1. A blow-molded container of thermoplastic resin having a finish and a hollow body with a generally cylindrical tempered side wall portion rotationally symmetric about a longitudinaly axis of the container, said container comprising a tempered shoulder portion integrally joining the tempered side wall portion to the finish, the tempered shoulder and the tempered sidewall portions being thermostabilized so as to relax the residual stresses therein to withstand hot filling, and a non-tempered integral base merging with the tempered side wall, the non-tempered base being defined by an outer surface comprising a plurality of non-tempered downward projections separated from each other by generally arcuate segments extending essentially from the cylindrical tempered side wall to the longitudinal axis of the container, a radially outwardly and upwardly curved non-tempered portion defining the lower most extent of the non-tempered downward projections, and an inclined non-tempered outer wall portion located between the cylindrical tempered side wall and the radially outwardly and upwardly curved non-tempered portion.

2. The blow-molded container of claim 1 wherein each of said non-tempered downward projections includes a first inclined portion contiguous to the longitudinal axis, a second inclined portion situated radially outside of, and axially displaced downwardly from, the first inclined portion, a generally perpendicular ring segment having an upper edge united with the first inclined portion and a lower edge united with the second inclined portion, said radially outwardly and upwardly curved non-tempered portion having an inner edge united with the second inclined portion and an outer edge united with said inclined non-tempered wall portion.

3. The blow-molded container of claim 2 wherein each of said non-tempered downward projections further includes a curved portion at the union of the generally perpendicular ring segment upper edge and the first inclined portion, the curved portion having a radius of between about 0.015 in. and about 0.090 in.

4. The blow-molded container of claim 3 wherein the base is further defined by a thickened portion extending from the inner margin of the first inclined portion through the lower edge of the generally perpendicular ring segment united with the second inclined portion, the thickened portion having a thickness of between about two to eight times the thickness of the side wall portion of the container.

5. The blow-molded container of claim 1 wherein the tempered shoulder and tempered sidewall portions are thermostabilized by pressurized contact with a heated portion of a mold during formation of the container and said non-tempered downward projections and said non-tempered inclined outer wall portion are not thermostabilized because of pressurized contact with a cooled portion of a mold during formation of the container.

6. The blow-molded container of claim 1 wherein the tempered shoulder and tempered sidewall portions are thermostabilized to withstand a fill temperature of at least about 170° F.

7. The blow-molded container of claim 6 wherein the tempered shoulder and tempered sidewall portions are thermostabilized to withstand an initial pressurization of at least 20 psi at the fill temperature.

* * * * *